April 14, 1953 R. F. STEHLIK 2,635,147

TELEPHONE SELECTOR SWITCH UTILIZING ODD-EVEN RELAY

Filed Oct. 25, 1948 4 Sheets-Sheet 1

*INVENTOR.*
RUDOLPH F. STEHLIK

BY *Chas. L. Cordy*

ATTORNEY

April 14, 1953 R. F. STEHLIK 2,635,147

TELEPHONE SELECTOR SWITCH UTILIZING ODD-EVEN RELAY

Filed Oct. 25, 1948 4 Sheets-Sheet 2

INVENTOR.
RUDOLPH F. STEHLIK

BY

Chas. W. Candy

ATTORNEY

INVENTOR.
RUDOLPH F. STEHLIK
BY Chas. W. Candy
ATTORNEY

April 14, 1953 R. F. STEHLIK 2,635,147

TELEPHONE SELECTOR SWITCH UTILIZING ODD-EVEN RELAY

Filed Oct. 25, 1948 4 Sheets-Sheet 4

INVENTOR.
RUDOLPH F. STEHLIK

BY *[signature]*

ATTORNEY

Patented Apr. 14, 1953

2,635,147

UNITED STATES PATENT OFFICE 2,635,147

TELEPHONE SELECTOR SWITCH UTILIZING ODD-EVEN RELAY

Rudolph Frank Stehlik, Antwerp, Belgium, assignor to Automatic Electric Laboratories, Inc., Chicago, Ill., a corporation of Delaware Application October 25, 1948, Serial No. 56,363

12 Claims. (Cl. 179—18)

This invention relates in general to telephone systems, and more particularly to automatic telephone systems employing switches of the single-motion rotary type, wherein one operating magnet is directively controlled to position the related switch on desired bank contacts, and the same magnet is later automatically controlled to return the switch to normal position.

It is an object of the invention to provide in a telephone system of the character described, new and novel circuit means for accomplishing the various telephone connections.

Another object of the invention is to provide in a telephone system of the character described, a simplified and inexpensive switch train wherein each switch utilizes two sets of wipers and associated bank contact sets in a new and novel manner for extending calls from two groups of lines to the next switch unit in the train.

A further object of the invention is to provide in a telephone system of the character described, an improved numerical switch which incorporates a relay of the so-called odd-even type functioning responsive to received impulses of a digit in a new and novel manner for causing the positioning of two sets of wipers according to the value of the received digit, and for connecting the switch to one of the sets of wipers to the exclusion of the other set of wipers also according to the value of the received digit.

A feature of the invention resides in the novel arrangement whereby the odd-even relay of a numerical switch always remains in the restored position with its operating magnet drawing no current after the relay has connected the switch to one or the other of the two sets of wipers.

Another feature of the invention is the provision of two sets of contact springs on the odd-even relay of a numerical switch which are operated and restored in the following novel manner. One of the two sets of springs is operated each time the magnet of the odd-even relay is energized, and is always restored to normal position each time the magnet is de-energized; and the other set of springs is operated only upon the first de-energization of the magnet of the odd-even relay, remaining operated until and through the second energization of the magnet, and is restored to normal position only upon the second de-energization of the magnet.

A further feature of the invention relates to the use of an "extra-control" wiper and associated row of bank contacts in a numerical switch cooperating with the functioning of the odd-even relay for controlling the operating magnet of the switch in a new and novel manner, whereby the two sets of wipers of the switch are automatically "kicked-off" the home position of one group of bank contacts to the home position of another group of bank contacts.

An additional feature of the invention concerns the new and novel manner in which the "kick-off" operation outlined in the preceding paragraph occurs when the odd-even relay is in an "even" position (relay has operated and restored twice) while the next odd-numbered impulse of a dialed digit is being received.

The various objects and features of the invention will be understood best from a perusal of the following detailed description of the drawings comprising Figures 1 to 9, inclusive, which show by means of the usual circuit diagrams a sufficient amount of apparatus to enable the invention to be described and understood.

Figure 3–A shows a telephone station connected in multiple to the respective bank contact sets in even-tens groups of the line-finder switches and the connector switches.

Figure 3–B shows a telephone station connected in multiple to the respective bank contacts sets in odd-tens groups of the line-finder switches and the connector switches.

Figures 3A, 3B, 4, 5:
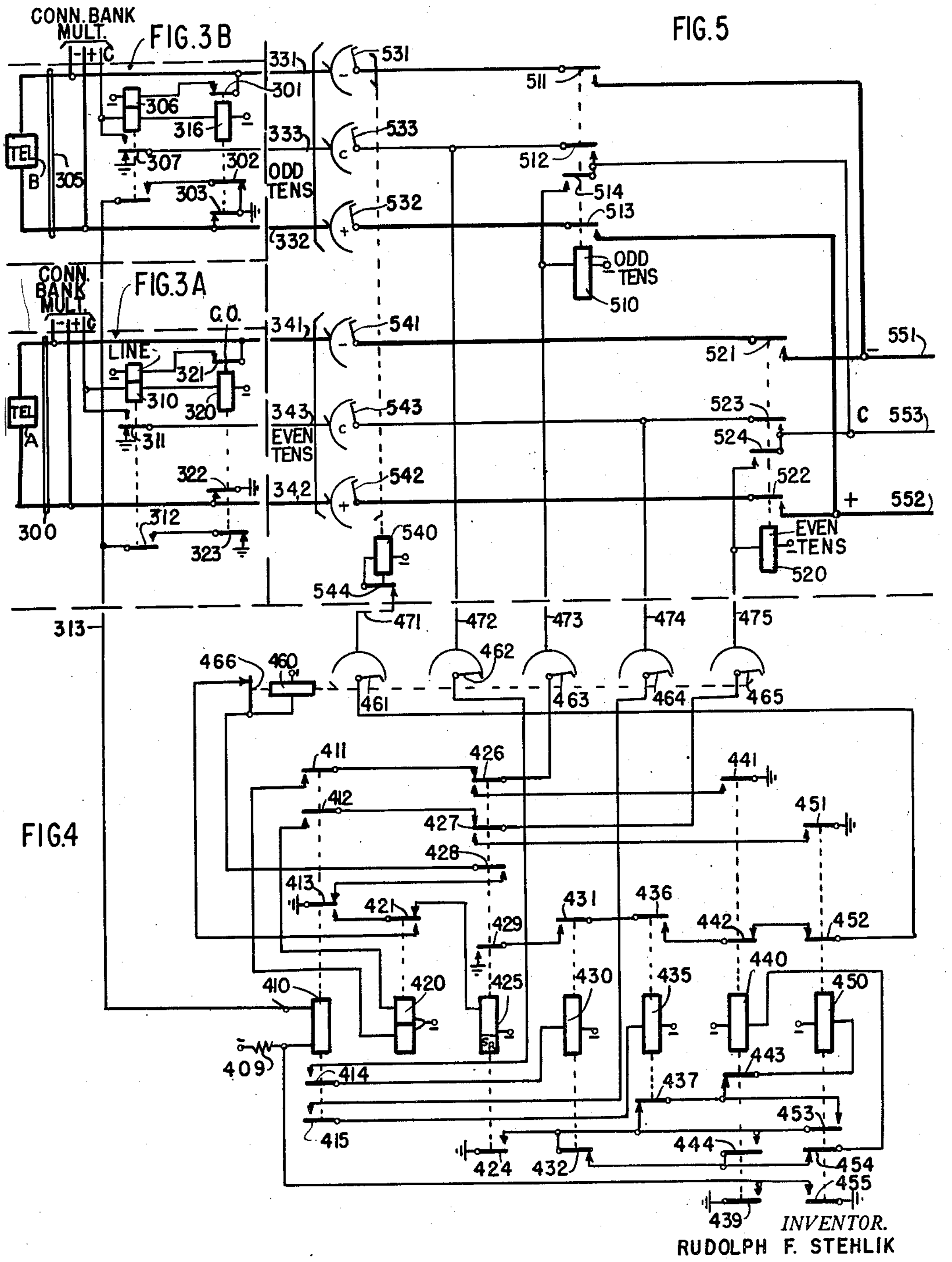

Figure 4 shows the relays and switch of the allotter which assigns line-finder switches to find calling lines.

Figure 5 shows one of the line-finder switches equipped with odd and even sets of wipers and associated banks.

Figures 6, 6A:
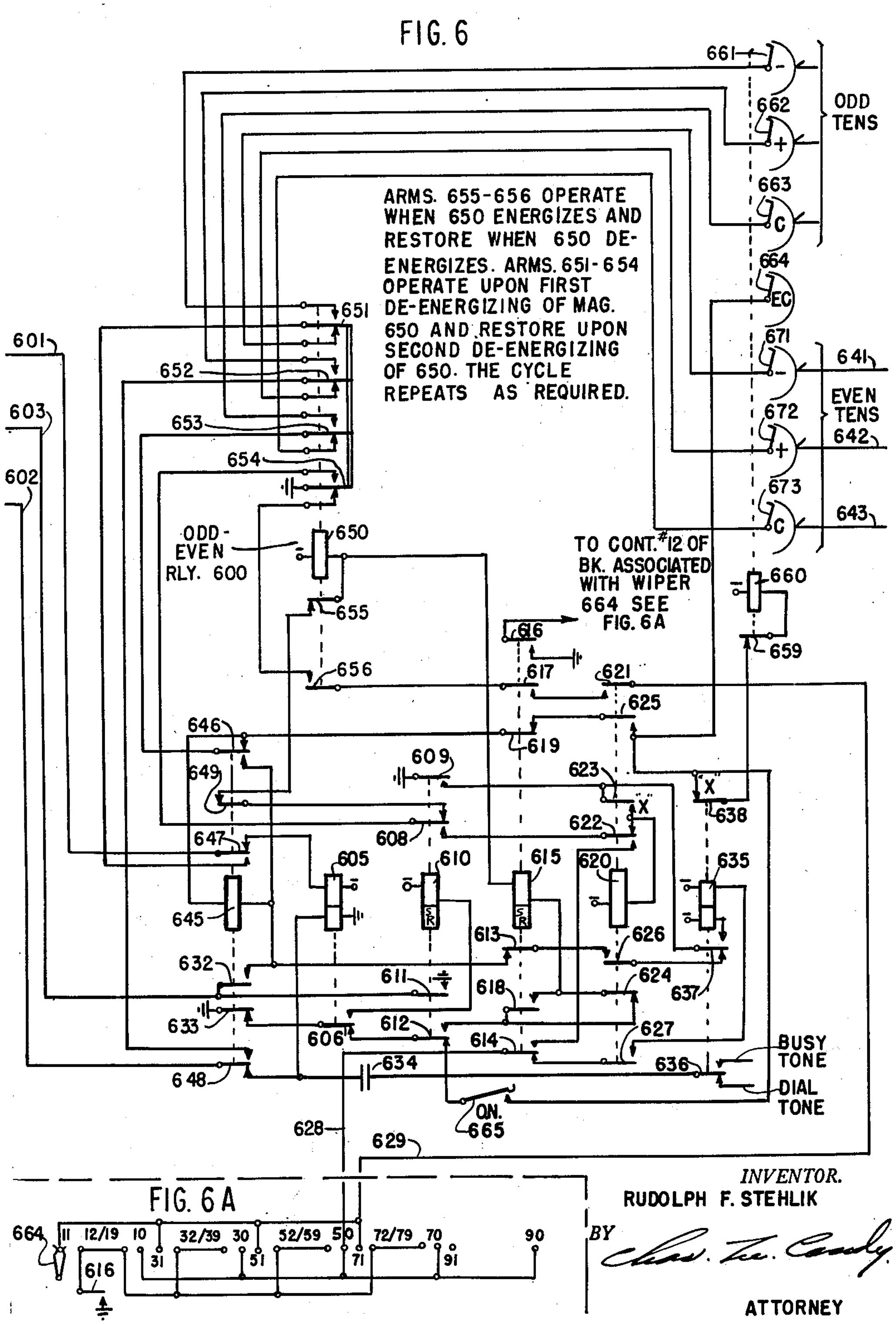

Figure 6 shows a selector switch equipped with odd and even sets of wipers and associated banks and, in addition, an extra-control wiper and associated bank.

Figure 6–A shows the wiring of the contacts of the extra-control bank associated with each selector switch. The extra-control bank is individual to each selector switch and, therefore, its contacts are not multipled to other selector switch extra-control banks.

Figures 7, 7A, 8:
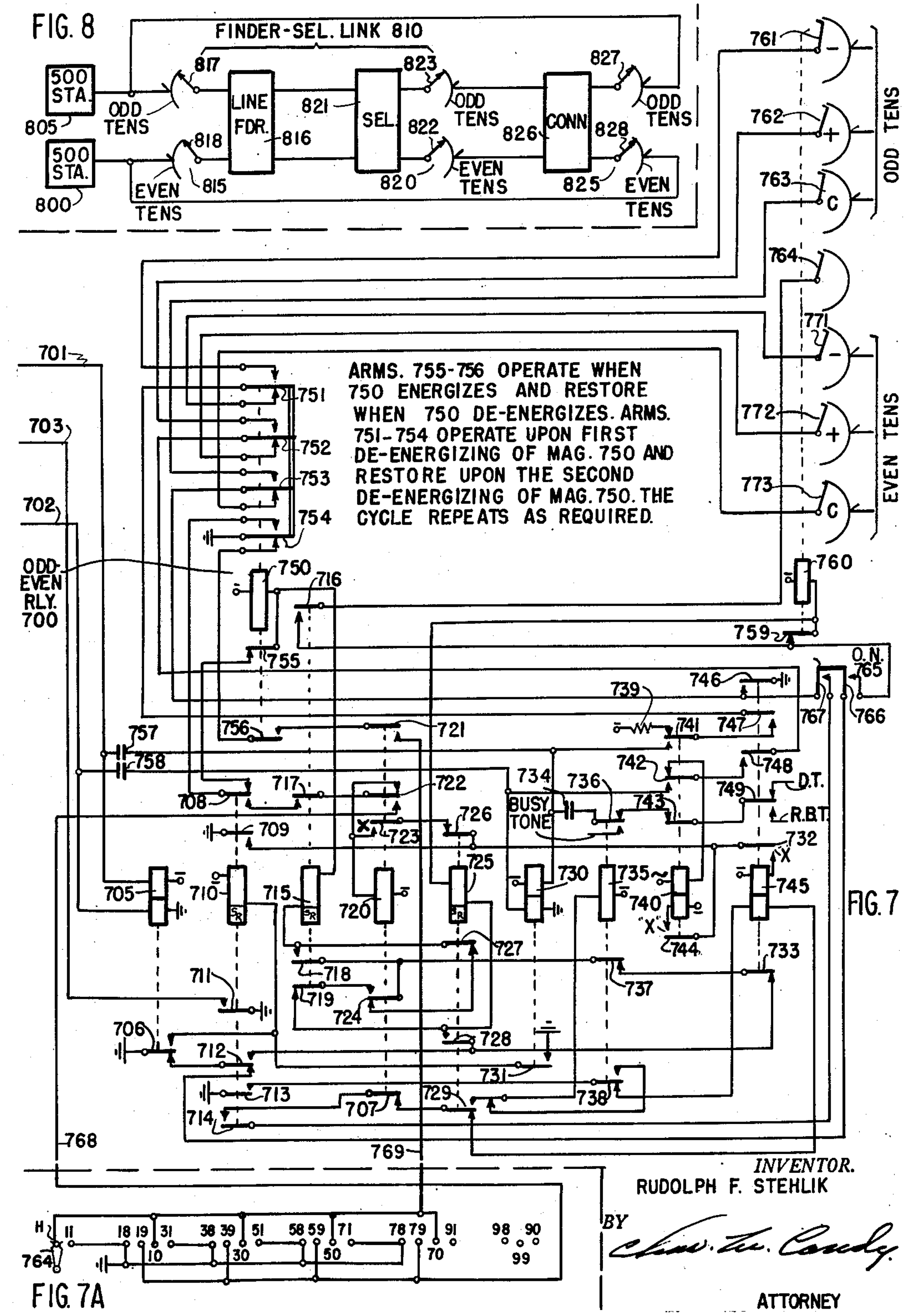

Figure 7 shows a connector switch equipped with odd and even sets of wipers and associated banks and, in addition, an extra-control wiper and associated bank.

Figure 7–A shows the wiring of the contacts of the extra-control bank associated with each connector switch. The extra-control bank is individual to each connector switch and, therefore, its contacts are not multipled to other connector switch extra-control banks.

Figure 8 shows the elements of the invention as applied to a telephone system of 1,000 stations.

Figure 9:
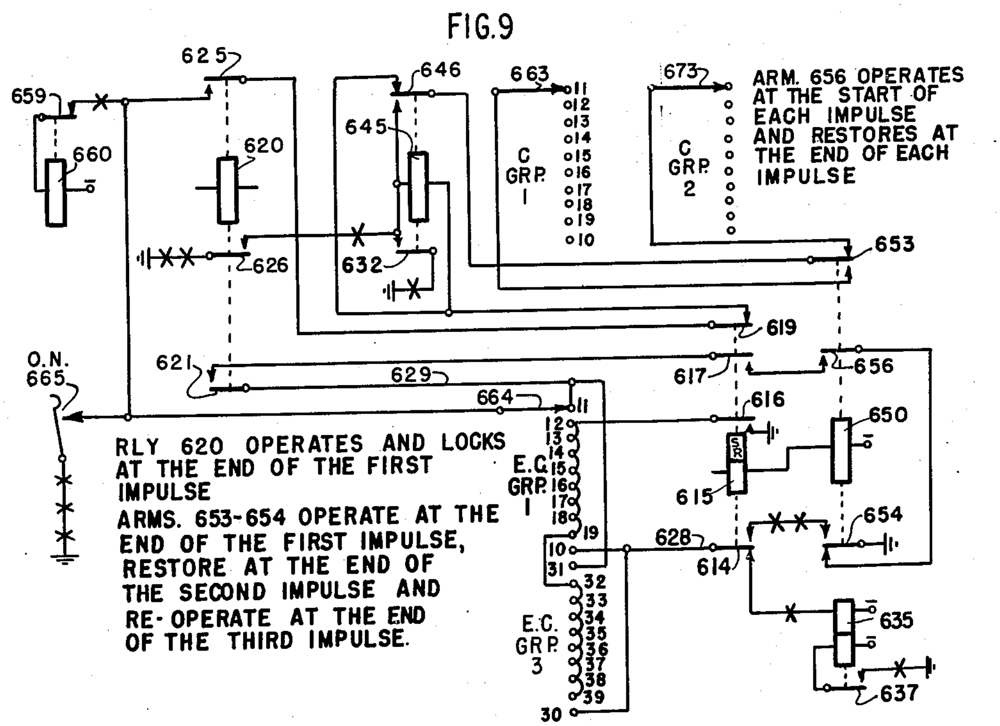

Figure 9 is a simplified diagram illustrating the various wiper stepping circuits of the selector switch shown in Figure 6.

Figure 1:
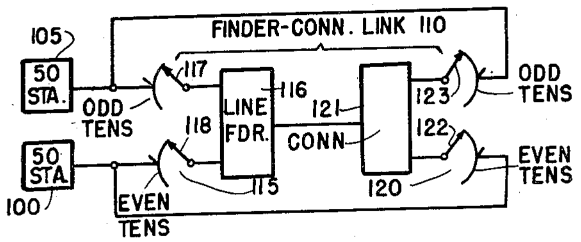
Figure 1 is a simple diagram illustrating the elements of the invention as applied to a 100-station system.

Referring now to Figure 1, the telephone exchange shown therein consists essentially of 100 telephone stations indicated at 100 and 105, and a number of finder-connector links, such as 110, interconnected to form a complete system. Each finder-connector link comprises a finder switch, such as 115, and a connector switch, such as 120. The finder switch 115 comprises a relay group 116, an odd-tens wiper 117 and associated bank of five groups of ten sets of contacts each, and an even-tens wiper 118 and associated bank of five groups of ten sets of contacts each. The connector switch 120 comprises a relay group 121, an odd-tens wiper 123 and associated bank of five groups of ten sets of contacts each, and an even-tens wiper 122 and associated bank of five groups of ten sets of contacts each. The 100 lines connecting the telephone stations to the switches are divided into two main groups of 50 lines each, the lines of one 50-group being connected to the contact sets of the odd-numbered groups (1, 3, 5, 7 and 9) of the line-finder and connector banks, and the lines of the other 50-group to the contact sets of the even-numbered groups (2, 4, 6, 8 and 0) of the line-finder and connector banks. Each sub-group of 10 lines is, therefore, known as an odd-tens group or an even-tens group, depending upon whether the 10 lines of the sub-group are connected to odd groups or even groups of the mentioned bank contacts.

Referring now to Figure 8, the telephone exchange shown therein consists essentially of 1000 telephone stations indicated at 800 and 805, a proper number of finder-selector links, such as 810, and a proper number of connector switches, such as 825, all interconnected to form a complete system. Each finder-selector link comprises a finder switch, such as 815, and a selector switch, such as 820. The finder switch 815 comprises a relay group 816, an odd-tens wiper 817 and associated bank of five groups of ten sets of contacts each, and an even-tens wiper 818 and associated bank of five groups of ten sets of contacts each. The selector switch 820 comprises a relay group 821, an odd-tens wiper 823 and associated bank of five groups of ten sets of contacts each, and an even-tens wiper 822 and associated bank of five groups of ten sets of contacts each. The connector switch 825 comprises a relay group 826, an odd-tens wiper 827 and associated bank of five groups of ten sets of contacts each, and an even-tens wiper 828 and associated bank of five groups of ten sets of contacts each. The 1000 lines connecting the telephone stations to the switches are divided into odd and even groups of 500 lines each, the finder-selector links into 10 groups, and the connector switches into 10 groups. Each group of finder-selector links and a corresponding group of connector switches are associated with 50 lines of the odd-numbered group of 500 lines and with 50 lines of the even-numbered group of 500 lines, the 50 odd-numbered lines being connected to the contact sets of the odd-numbered groups (1, 3, 5, 7 and 9) of the line-finder and connector banks, and the 50 even-numbered lines being connected to the contact sets of the even-numbered groups (2, 4, 6, 8 and 0) of the line-finder and connector banks. Each sub-group of 10 lines is, therefore, known as an odd-tens group or an even-tens group, depending upon whether the 10 lines of the sub-group are connected to odd groups or even groups of the mentioned finder and connector bank contact sets. Five groups of the connector switches are connected to the contact sets of the odd-numbered groups (1, 3, 5, 7 and 9) of the selector switch banks, and the other five groups of the connector switches to the contact sets of the even-numbered groups (2, 4, 6, 8 and 0) of the selector switch banks. Each connector group is, therefore, known as an odd-tens group or an even-tens group, depending upon whether the connector group is connected to an odd group or an even group of the selector switch banks.

In a manner similar to that just described for a 1,000-station system, the invention can be applied equally as well to a 100,000-station system or a 1,000,000-station system by the introduction of proper groups of intermediate selector switches between the selector switch banks of the finder-selector links and the groups of connector switches.

Referring now to Figures 3–A and 3–B, a telephone substation is associated with each of the telephone lines in the system, the substations "A" (Figure 3–A) and "B" (Figure 3–B) being respectively associated with telephone lines 300 and 305. Each of the substations is provided with a telephone instrument, a dial mechanism, and a ringer. Each telephone line includes a line relay and a cut-off relay, these relays in line 300 being respectively indicated at 310 and 320, and in line 305 at 306 and 316.

Figure 2:
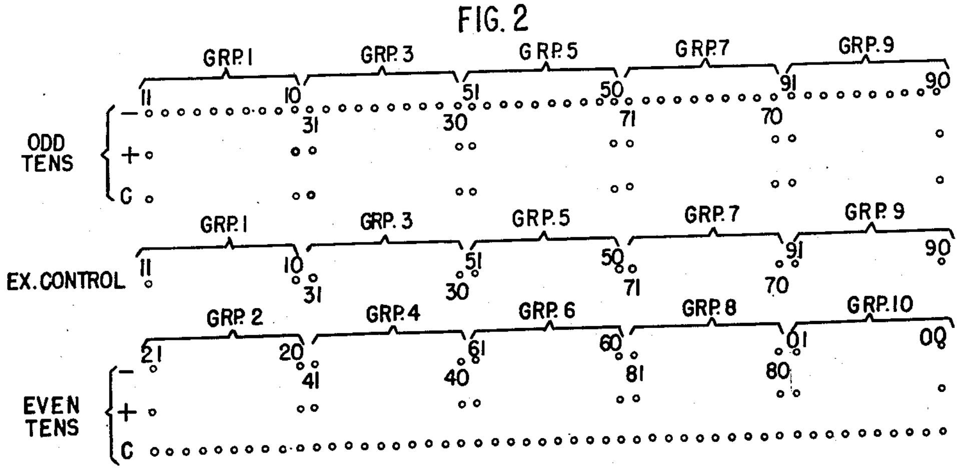
Figure 2 shows the numbering and grouping of the bank contact sets associated with the various switches.

The line-finder switches of the links and the allotter switch of the line-finder allotter are mechanically similar to well-known step-by-step rotary switches having no normal, or home, position, while the circuits thereof have been altered in accordance with the present invention. The line-finder switches of the links are each fitted with two sets of wipers, two sets of banks, and two switching-through relays, as shown in Figure 5. The two sets of banks each comprise three rows of contacts designated "–," "+" and "C" respectively. One set of three rows of contacts is known as the odd-tens set, and is further divided into five groups of ten contacts sets designated groups "1," "3," "5," "7," and "9," as shown in Fig. 2. The other set of three rows of contacts is known as the even-tens set, and is further divided into five groups of ten contact sets designated groups, "2," "4," "6," "8" and "10," also as shown in Fig. 2. The contact sets of group "2" are in alignment with the contact sets of group "1" so that as the odd-tens wipers of the line-finder switch are passing over the contacts of group "1," the even-tens wipers are similarly passing over the contacts of group "2." The contact sets of group "4" are in similar alignment with the contact sets of group "3," the contact sets of group "6" with the contact sets of group "5," etc.

The selector switch shown in Figure 6 is mechanically similar to the line-finder switch shown in Figure 5 with the general difference that it is directively controlled from a normal, or home, position by impulses to select a particular group of bank contacts, and then automatically hunts in that group of bank contacts for a free outlet. Each selector switch is fitted with two sets of trunk wipers, one "extra-control" wiper, two sets of trunk banks and one "extra-control" bank. The two sets of trunk banks each comprise three rows of contacts designated "—," "+" and "C" respectively. The extra-control bank comprises one row of contacts designated "extra-control," and is located between the two sets of trunk banks. The arrangement and grouping of the seven rows of contacts is shown in Figure 2, it being appreciated that there are no individual extra-control contacts for the even-tens group "2," "4," "6," "8" and "0." The extra-control contacts for the odd-tens groups "1," "3," "5," "7," and " 9" also respectively serve for the even-tens groups "2," "4," "6," "8" and "0" since the odd-tens and even-tens groups are aligned in pairs in a manner similar to that described for the bank contacts of the line-finder switches.

The connector switch shown in Figure 7 is mechanically similar to the line-finder switch shown in Figure 5 but instead of hunting for a marked potential as the line-finder does, the connector is directively controlled from a normal, or home, position by impulses. Each connector switch is fitted with two sets of line wipers, one "extra-control" wiper, two sets of line banks and one "extra-control" bank. The arrangement and grouping of the seven rows of contacts is similar to that described in the preceding paragraph for the selector switches with the general differences that the word "line" is substituted for the word "trunk," and that the "extra-control" bank is fitted with an additional "home" contact located just to the left of contact 11 of group "1" as shown in Figure 7-A.

Both the selector switch (Figure 6) and the connector switch (Figure 7), in addition to being equipped with conventional type relays, are each fitted with an odd-even type of relay for selecting either odd or even sets of wipers. One form of odd-even relay is described in the co-pending application Serial No. 30,555, filed June 2, 1948, to which reference may be had for the mechanical and operating details of the odd-even relay. For the purposes of this specification, however, it should suffice to understand that the sets of contact springs shown below the magnet of the odd-even relay in both Figures 6 and 7 are operated each time the magnet is energized, and are always restored to normal each time the magnet is de-energized; and that the contact spring sets shown above the magnet of the odd-even relay in both Figures 6 and 7 are operated only upon the first de-energization of the magnet, remaining operated until and through the second energization of the magnet, and are restored to normal only upon the second de-energization of the magnet. The cycle of operations is repeated as required.

Both the selector switch (Figure 6) and the connector switch (Figure 7) are each further equipped with a set of off-normal contact springs which operates when the wipers of the switch are stepped from their normal positions, and which restores to normal when the switch wipers are returned to their respective normal positions.

It should be understood at this time that while an embodiment of the present invention disclosed and described in this specification includes switches having banks of 50 contact sets each, the invention is not limited to the particular form shown but may utilize other bank-capacity switches.

It should be further understood that while a plurality of battery connections are shown in the drawings, they are preferably the same battery. Also, in order to simplify the drawings further, relay contacts for starting and stopping the operation of the tone and ringing current generating equipment have been omitted. An "X" contact shown in association with a relay armature is a contact that makes or breaks before any other contacts of the particular relay are opened or closed, thus characterizing the relay as a two-step relay.

Having described the equipment and apparatus, a detailed description of the operation will now be given.

*Calls in a 100-station system*

Briefly, calls are completed in the following manner: The person at the calling station lifts the handset from the telephone cradle and, after hearing conventional dial tone, dials the number of the desired station. If the called station is in use, the calling person receives a busy tone. If the called station is not busy, the called station is rung automatically and intermittently.

In order to describe a call in detail, it is assumed that station "A" (Fig. 3-A) desires to call station "B" (Fig. 3-B). It should be understood at this time that each link in the 100-station system comprises a line-finder switch, such as Figure 5, directly connected to a connector switch, such as Figure 7, by means of conductors, such as 551, 552, 553, 701, 702 and 703. It should also be understood at this time that the functions of connector switch, Figure 7, relating to dial tone, busy back, ringing the called line and the like are typical for explanatory purposes only, and that this invention can be applied equally as well to any of the many well-known connector switch circuits. The selector switch, Figure 6, is not included in the 100-station system.

Responsive to the lifting of the handset from the telephone cradle at station "A," a circuit for energizing line relay 310 is completed from ground, armature 322, lower conductor of line 300, telephone "A," upper conductor of line 300, armature 321, upper winding of line relay 310 to battery. At armature 311 and working contact, line relay 310 marks station "A" as calling in the even-tens bank of the finder switch accessible to wiper 543 by connecting battery thereto through the winding of cut-off relay 320 and the lower winding of line relay 310 by way of conductor 343. At armature 312, line relay 310 completes a circuit to start relay 410 (Fig. 4) from ground, armatures 323, 312, conductor 313, winding of start relay 410 to battery, causing start relay 410 to operate.

At armature 411, start relay 410 connects the lower winding of relay 420 to wiper 463: at armature 412, connects the upper winding of relay 420 to wiper 465: at armature 414, connects relay 430 to wiper 462; and, at armature 415, connects relay 435 to wiper 464. If either the odd-tens relay 510 or the even-tens relay 520 of the finder switch now associated with the allotter (Figure 4) are in the operated position due to the finder switch being in prior use, then relay 420 of the allotter will operate through either its lower or upper winding (depending upon whether ground is returned over conductor 473 or conductor 475). A circuit is correspondingly completed to magnet 460 of the allotter from ground, armature 413 and working contact, armature 421 and working contact, interrupter springs 466, winding of magnet 460 to battery. Magnet 460 accordingly self-drives wipers 461—465 in well known-manner to the bank contacts of the next finder switch. If this finder switch is also in prior use, relay 420 will remain operated and the circuit of magnet 460 is again completed at interrupter springs 466, thereby to cause wipers 461—465 to be advanced to the next finder switch. This interaction will continue until a free finder switch is found, whereupon relay 420 will restore and disable the circuit of magnet 460 at armature 421, thereby preventing further advancement of wipers 461—465. As long as busy finder switches are tested, either relay 430 or relay 435 may correspondingly operate, but since neither relay 430 nor relay 435 directly control circuits when relay 425 is in the non-operated position, no circuits would be completed or disabled.

Assuming now that the finder switch of Figure 5 has been selected by allotter Figure 4 and that this finder switch is in the idle position, then relay 420 restores and completes a circuit to relay 425 from ground, armature 413 and working contact, armature 421 and resting contact, winding of relay 425 to battery, causing relay 425 to operate. Assuming further that the odd-tens wipers and the even-tens wipers of the finder switch are standing on the bank contacts of line circuits not in use (idle), then a circuit is completed for relay 430 from ground, armature 397 and resting contact (Figure 3–B), conductor 393, bank contact, wiper 533, conductor 472, bank contact, wiper 462, armature 414, winding of relay 430 to battery; and a circuit is completed for relay 435 from ground, armature 311 and resting contact (Figure 3–A), conductor 343, bank contact, wiper 543, conductor 474, bank contact, wiper 464, armature 415, winding of relay 435 to battery. Both relays 430 and 435 correspondingly operate, and a circuit is completed for magnet 540 of the finder switch from ground, armatures 429, 431, 436, 442, 452, wiper 461, bank contact, conductor 471, interrupter armature 544, winding of magnet 540 to battery. Magnet 540 accordingly self-drives wipers 531, 532, 533, 541, 542 and 543 in well-known manner as long as either wiper 533 or wiper 543 find ground on the bank contacts of tested line circuits.

When control wiper 543 of the line-finder connects with the bank contact associated with conductor 343 (station "A"), battery through windings of cut-off relay 320 and line relay 310, armature 311 and working contact shunts down relay 435 causing relay 435 to open the circuit of magnet 540 at armature 436, thereby stopping wipers 541, 542 and 543 on the bank contacts connected to line circuit 300. The restoration of relay 435 completes a circuit for relay 450 from ground, armatures 424, 437, 443, winding of relay 450 to battery, causing relay 450 to operate and lock to ground by way of armatures 443, 453 and 424. At armature 451, relay 450 connects ground to conductor 475 of the finder switch by way of armature 427 and working contact, wiper 465 and bank contact, thereby to operate even-tens relay 520 and cut-off relay 320, the circuit for cut-off relay 320 being completed through armatures 523 and 524. At armature 455, relay 450 shunts start relay 410, causing relay 410 to restore and open the circuit of relay 425 at armature 413. Relay 425, however, is of the slow-to-release type and, therefore, does not restore immediately, but retains relay 450 operated for a short interval at armature 424. At armature 454, relay 450 opens another point in the circuit to relay 440, thereby to prevent the possible operation of relay 440 as long as relay 450 is operated. At armature 413 and resting contact, relay 410 completes a circuit to magnet 460 of the allotter before relay 425 has had sufficient time to restore. As relay 425 restores, this last circuit to magnet 460 is opened at armature 428, and magnet 460 steps wipers 461—465 of the allotter to the bank contacts of the next line-finder switch.

The operation of even-tens relay 520 of the line-finder connects wipers 541, 542 and 543 to conductors 551, 552 and 553 leading to conductors 701, 702, and 703 of the connector switch (Figure 7) of the link by way of armatures 521, 522 and 523, thereby to seize the connector switch, and ground returned over conductors 703 and 553 from the connector switch is extended to even-tens relay 520, wiper 543 and cut-off relay 320 before relay 425 in the allotter restores and opens the circuit of relay 450. The ground from the connector switch to wiper 543 is extended to the connector multiple bank contacts associated with conductor 343, thereby guarding telephone station "A" from intrusion.

Cut-off relay 320, upon operating, disconnects the upper winding of line relay 310 at armatures 321 and 322 to free the line from attachments, but line relay 310 remains operated through its lower winding and the winding of cut-off relay 320. At armature 323, cut-off relay 320 removes ground from start relay 410 of the finder-switch allotter, thereby freeing the finder-switch allotter from further control by station "A."

Should even-tens wipers 541, 542 and 543 have been standing on the bank contacts of line 300 when station "A" initiated the call, there would have been no rotation of the finder switch because battery through the windings of cut-off relay 320 and line relay 310 would have been immediately connected to wiper 543. In that case relay 435 could not operate, and the circuit for magnet 540 of the finder-switch would remain open at armature 436. At armature 437, relay 435 would complete the circuit for relay 450 from ground, armatures 424, 437, 443, winding of relay 450 to battery, causing relay 450 to operate and lock to ground by way of armatures 443, 453 and 424. At armature 451, relay 450 would connect ground to conductor 475 of the finder-switch by way of armature 427 and working contact, wiper 465 and bank contact, thereby to operate even-tens relay 520 and cut-off relay 320, the circuit for cut-off relay 320 being completed through armatures 523 and 524.

Line 300 of station "A" is connected to line relay 705 of the link connector switch by way of conductors 551, 701, 552 and 702, thereby causing relay 705 to operate. At armature 706 and working contact, relay 705 completes the circuit to relay 710, causing relay 710 to operate. At armature 711, relay 710 returns ground to conductor 703 and conductor 553 of the link finder switch. Dial tone is supplied to station "A" by way of armature 749 and resting contact, armature 743, armature 736 and resting contact, condensers 734 and 757, conductor 701, conductor 551, armature 521, wiper 541, bank contact, and negative talking conductor of line 300 leading back to station "A."

Upon hearing the well-known dial tone, the calling person at station "A" dials the number of station "B" which, in this instance, will be assumed to be digit "15." Responsive to the dialling of the digit "1," the circuit to line relay 705 of the connector switch is interrupted once, thereby causing relay 705 to restore momentarily. At armature 706, relay 705 opens the circuit to relay 710, but relay 710 is of the slow-to-release type and, therefore, does not restore during this impulsing period. Consequently, the circuits controlled by relay 710 are not disturbed. At armature 706 and resting contact, relay 705 transmits an impulse to relay 715 in series with magnet 750 of odd-even relay 700, causing relay 715 to operate and magnet 750 to energize. This series circuit may be traced from ground by way of armature 706 and resting contact, armature 712 and working contact, armatures 733, 737, 724 and resting contact, 727, winding of relay 715, winding of magnet 750 to battery. Armatures 755 and 756 are operated responsive to the energization of magnet 750 but perform no functions at this time. Armatures 751—754 of odd-even relay 700 do not operate upon the energization of magnet 750. Relay 715 is of the slow-to-release type and will, therefore, remain operated during this impulsing period.

Relay 705 reoperates upon the cessation of the impulse of the digit "1" and, at armature 706, opens the series circuit through relay 715 and magnet 750. Magnet 750 correspondingly de-energizes thereby to cause the operation of armatures 751—754. Armature 754 completes a circuit from ground, armature 754 and working contact, armature 708 and working contact, armature 717, armature 722 and resting contact, winding of relay 720 to battery, causing relay 720 to operate and lock to ground by way of armatures 723, 726 and 709. Relay 715 restores after a short interval.

As previously explained, the groups "1" and "2" of the connector switch banks are in alignment with each other, i. e., the first contact set of group "1" is in alignment with the first contact set of group "2," etc. Odd-tens wipers 761, 762 and 763 normally stand positioned just to the left of group "1": wipers 771, 772 and 773 normally stand positioned just to the left of group "2"; and extra-control wiper 764 normally stands on the "H," or home, contact just to the left of the first contact (11) of group "1." It will, therefore, be readily seen that the impulse of the dialed digit "1" is not required to operate magnet 760 for the purpose of advancing wipers 761, 762 and 763 to group "1," but is required for causing one energization and one de-energization of magnet 750 of odd-even relay 700, thereby to select wipers 761, 762 and 763 at the time relay 715 restores to normal and, at armature 719, prepares a point in the circuit of relay 725. This action represents the tens digit (1) of the telephone number of station "B." It will also be observed that, at this point of the operation, odd-even relay 700 is in the restored position with magnet 750 drawing no current.

Responsive to the dialling of the units digit "5," the circuit to line relay 705 of the connector switch is interrupted five times thereby causing relay 705 to be de-energized five times. Relay 705, therefore, restores momentarily for each impulse and, at armature 706, opens the circuit to relay 710. Relay 710, however, is of the slow-to-release type and, therefore, does not restore during this impulsing period. Consequently the circuits controlled by relay 710 are not disturbed. At armature 706 and resting contact, relay 705 transmits an impulse to relay 725 in series with magnet 760 for each de-energization. This series conduit may be traced from ground, armature 706 and resting contact, armature 712 and working contact, armatures 733, 737, 724 and working contact 719, winding of relay 725, winding of magnet 760 to battery. Relay 725 operates with the first impulse of the digit "5" and, at armature 728, completes a series circuit through relay 725 and 760 for the remaining four impulses of the digit "5." At armature 726, relay 725 opens the locking circuit of relay 720, causing relay 720 to restore. Relay 725 is of the slow-to-release type and will therefore remain operated during the complete impulsing period of the digit "5."

Magnet 760 follows the impulsing of relay 705 and in well-known manner steps the wipers of the connector switch to the fifth bank contacts of groups "1" and "2." The operation of the connector switch at this time is dependent upon whether line circuit 305 of station "B" is in use or is free. Should line 305 of station "B" be in prior use, then ground will be encountered by control wiper 763 which causes busy relay 735 to operate from ground by way of wiper 763, armature 753 and working contact, contact 767 of off-normal spring set 765, armatures 714, 707, 729 and working contact, winding of relay 735 to battery. Relay 735 locks to ground by way of armature 729 and resting contact (as relay 725 restores after the impulsing of the digit "5" has been completed) armature 738 and working contact and armature 713. At armature 736 and working contact, relay 735 connects busy tone to station "A" by way of condensers 734 and 757, conductor 701, conductor 551, armature 521, wiper 541, bank contact and negative talking conductor of line 300 leading back to station "A."

Assuming now that line 305 is free (idle), then there will be no ground on wiper 763. Relay 725 restores shortly after the impulsing period of the digit "5" and, at armature 729 and resting contact, extends ground to wiper 763 by way of armature 713, 738 and resting contact, lower winding of relay 745, armature 729 and resting contact, armatures 707, 714, contacts 767 of off-normal spring set 765, and armature 753 and working contact. This ground is extended through wiper 763, bank contact, multiple C conductors to connector C bank contacts of group "1" and also to line 305, lower winding of line relay 306, winding of cut-off relay 316 to battery, causing relay 745 of the connector switch and relay 316 of line 305 to operate. The operation of cut-off relay 316 clears line 305 of attachments. Although line relay 306 does not operate on calls incoming to line 305, the finder bank contacts of line relay 306 test busy to a hunting finder switch because ground is normally connected to conductor 333 at armature 307 and resting contact.

Relay 745 of the connector switch locks to ground by way of armature 709, armature 732, upper winding of relay 745 to battery. At armature 746, relay 745 extends direct ground to wiper 763 for guarding the connection from intrusion: at armature 749, removes dial tone from the contacting circuit: at armature 748 connects grounded interrupted generator through upper winding of ringing cut-off relay 740, armature 742 and resting contact, armature 748, armature 752 and working contact, wiper 762, bank contact, multiple positive conductors to the positive side of line 305: at armature 747, connects battery through resistor 739, armature 741 and resting contact, armature 747, armature 751 and working contact, wiper 761, bank contact, multiple negative conductors to negative side of line 305; and, at armature 749 and working contact, connects ring back tone through armature 743, armature 736 and resting contact, condensers 734 and 757 to the negative talking conductor leading back to station "A," for indicating that station "B" is being signalled automatically and intermittently.

When the call is answered at station "B" by the lifting of the handset from the cradle, ring cut-off relay 740 is operated over station "B" loop. At armature 744, relay 740 completes an obvious locking circuit for itself. At armatures 741 and 742, relay 740 disconnects the ringing circuit from wipers 761 and 762: at armature 741 and working contact, switches wiper 761 to the upper winding of relay 730: at armature 742 and working contact, switches wiper 762 to the lower winding of relay 730; and, at armature 743, disconnects ring back tone from station "A." Relay 730 operates over station "B" loop and, at armature 731, extends a multiple ground to relay 710. Stations "A" and "B" are now connected together with talking battery supplied to station "A" through the windings of relay 705, and talking battery to station "B" through the windings of relay 730.

When the conversation between stations "A" and "B" has been terminated and both handsets returned to their respective cradles, the connection is released in the following manner. The opening of station "A" loop circuit causes relay 705 to restore, thereby removing one ground circuit to relay 710 at armature 706. The opening of station "B" loop circuit causes relay 730 to restore, thereby removing the second ground circuit to relay 710 at armature 731. Relay 710, therefore, restores after a short interval. At armature 711, relay 710 removes ground from conductors 703 and 553, thereby unlocking even-tens relay 520 of the finder switch and opening the circuit to the lower winding of line relay 310 and the winding of cut-off relay 320 of line 300, causing all relays to restore. The restoration of cut-off relay 320 re-connects the upper winding of line relay 310 across line 300, thereby restoring line 300 to normal. The restoration of even-tens relay 520 returns the line finder switch of the link to normal. At armature 709, relay 710 unlocks relay 740 permitting this relay to restore, and, at armatures 709 and 713, opens the circuit of the two windings of relay 745, permitting this relay to restore. At armature 746, relay 745 removes the last ground connection to wiper 763, thereby removing guarding potential from the connector bank contacts of line 305 and opening the circuit of cut-off relay 316 of line 305. The restoration of cut-off relay 316 reconnects the upper winding of line relay 306 across line 305, thereby restoring line 305 to normal. All of the relays of the connector switch are now at normal, and a homing circuit for the connector switch is completed from ground, armature 706 and resting contact, armature 712 and resting contact, contact 766 of off-normal spring set 765, interrupter armature 759, winding of magnet 760 to battery. Magnet 760 consequently self-drives wipers 761—773 in a well-known manner until the wipers arrive at their respective normal positions just to the left of the respective first bank contacts of groups "1" and "2," whereupon the circuit of magnet 760 is opened at off-normal contact 766. At armature 708, relay 710 completes a circuit for magnet 750 of odd-even relay 700 from ground, armature 754 and working contact, armature 708 and resting contact, interrupter armature 755, winding of magnet 750 to battery, causing magnet 750 to energize. At armature 755, magnet 750 opens its energizing circuit thereby to cause armatures 751—754 to restore to normal, whereupon the energizing circuit of magnet 750 is maintained open at the working contact of armature 754. The entire connection has now been released and all circuits restored to their respective normal positions.

Assuming now that the telephone number of station "B" is "25" instead of "15," then the dialling of the digit "2" causes the following operation of the connector switch Figure 7. At 706 and resting contact, relay 705 transmits the first impulse of the digit "2" to relay 715 in series with magnet 750, causing relay 715 to operate and magnet 750 to energize. This series circuit may be traced from ground, armature 706 and resting contact, armature 712 and working contact, armatures 733, 737, 724 and resting contact, 727, winding of relay 715, winding of magnet 750 to battery. Armatures 755 and 756 of odd-even relay 700 are operated responsive to the energization of magnet 750 but perform no functions at this time. Armatures 751—754 of odd-even relay 700 do not operate upon the energization of magnet 750. Relay 715 is of the slow-to-release type and will therefore, remain operated during the complete impulsing period of the digit "2." At armature 718, relay 715 completes a series circuit to relay 715 and magnet 750 for the remaining impulse of the digit "2" independent of armatures 724 and 727; and, at armature 719, opens a point in the circuit of relay 725 to prevent possible operation of relay 725 and magnet 760 at this time.

Relay 705 re-operates upon the cessation of the first impulse of the digit "2" and, at armature 706, opens the series circuit through relay 715 and magnet 750. Magnet 750 correspondingly de-energizes thereby to cause the operation of armatures 751—754. Armature 754 completes a circuit for relay 720 from ground, armature 754 and working contact, armature 708 and working contact, armature 717, armature 722 and resting contact, winding of relay 720 to battery, causing relay 720 to operate and lock to ground by way of armatures 723, 726 and 709.

At armature 706 and resting contact, relay 705 transmits the second impulse of the digit "2" to relay 715 in series with magnet 750 from ground, armature 706 and resting contact, armature 712 and working contact, armatures 733, 737, 718, windings of relay 715 and magnet 750 in series to battery, causing magnet 750 to re-energize and relay 715 to remain operated. Armatures 751—754 remain operated during the re-energization of magnet 750.

Relay 705 re-operates upon the cessation of the second impulse of the digit "2" and, at armature 706, opens the series circuit through relay 715 and magnet 750, magnet 750 de-energizing for the second time thereby to cause armatures 751—754 to be restored. Relay 715 restores after a short interval and, at armature 719, prepares a point in the circuit for relay 725.

As previously explained, the groups "1" and "2" of the connector switch banks are in alignment with each other. Odd-tens wipers 761, 762 and 763 normally stand positioned just to the left of group "1," wipers 771, 772 and 773 normally stand positioned just to the left of group "2," and extra-control wiper 764 normally stands on the "H," or home, contact just to the left of the first contact (11) of group "1." It will, therefore, be readily seen that the two impulses of the dialled digit "2" are not required for positioning wipers 771, 772 and 773 with respect to group "2," but are required in this instance for causing two energizations and two de-energizations of magnet 750 of odd-even relay 700, thereby to cause armatures 751—754 to select wipers 771—773 at the time that relay 715 restores to normal and, at armature 719, prepares a point in the circuit of relay 725. It will also be observed that, at this point of operation, odd-even relay 700 is in the restored position with magnet 750 drawing no current. The connector switch is now in a position to respond to the dialling of the units digit "5" of the telephone number of station "B," and from this point on the operation is similar to that previously described for the case where the telephone number of station "B" was "15."

Assuming now that the telephone number of station "B" is "35" instead of "15" or "25," then the dialling of the digit "3" causes the following operation of the connector switch Figure 7. At armature 706 and resting contact, relay 705 transmits the first impulse of the digit "3" to relay 715 in series with magnet 750, causing relay 715 to operate and magnet 750 to energize. Armatures 755 and 756 operate responsive to the energization of magnet 750 but perform no function at this time. Armatures 751—754 do not operate upon the energization of magnet 750. Relay 715 is of the slow-to-release type and, therefore, remains operated during the complete impulsing period of the digit "3." At armature 718, relay 715 completes the series circuit through relay 715 and magnet 750 for the remaining two impulses of the digit "3" independent of armatures 724 and 727 and, at armature 719, opens a point in the circuit of relay 725 to prevent possible operation of relay 725 and magnet 760 at this time.

Relay 705 re-operates upon the cessation of the first impulse of the digit "3" and, at armature 706, opens the series circuit through relay 715 and magnet 750. Magnet 750 correspondingly de-energizes thereby to cause the operation of armatures 751—754. Armature 754 completes a circuit for relay 720 from ground, armature 754 and working contact, armature 708 and working contact, armature 717, armature 722 and resting contact, winding of relay 720 to battery, causing relay 720 to operate and lock to ground by way of armatures 723, 726 and 709.

At armature 706 and resting contact, relay 705 transmits the second impulse of the digit "3" to relay 715 in series with magnet 750 from ground, armature 706 and resting contact, armature 712 and working contact, armatures 733, 737, 718, windings of relay 715 and magnet 750 in series to battery causing magnet 750 to re-energize and relay 715 to remain operated. Armatures 751—754 remain operated during the re-energization of magnet 750. Relay 705 re-operates upon the cessation of the second impulse of the digit "3" and, at armature 706, opens the series circuit through relay 715 and magnet 750, magnet 750 de-energizing for a second time thereby to cause armatures 751—754 to be restored.

At armature 706 and resting contact, relay 705 transmits the third impulse of the digit "3" to relay 715 in series with magnet 750 from ground, armature 706 and resting contact, armature 712 and working contact, armature 733, 737, 718, windings of relay 715 and magnet 750 in series to battery, causing magnet 750 to re-energize for a second time and relay 715 to remain operated. As magnet 750 re-energizes and operates armature 756, a circuit is completed from ground, armature 754 and resting contact, armatures 756, 721, conductor 769, contact H (Figure 7-A) of the extra-control bank, extra-control wiper 764, armature 716, interrupter armature 759, winding of magnet 760 to battery, thereby causing magnet 760 to self-drive the wipers of the connector switch to the first bank contact sets of groups "1" and "2." As extra-control wiper 764 connects with the second contact (11) of its bank, the stepping circuit for magnet 760 is maintained by ground on contact 11 and, since contacts 11—18 are multipled together, magnet 760 continues to self-drive the wipers of the connector switch until the wipers reach the respective contacts 19 and 29 of the banks.

Relay 705 re-operates upon the cessation of the third impulse of the digit "3" and, at armature 706, opens the series circuit through relay 715 and magnet 750. Magnet 750 correspondingly de-energizes for the third time thereby to cause a re-operation of armatures 751—754. Relay 715, however, is of the slow-to-release type and therefore maintains its armatures in the respective operating positions for a short interval. As a consequence a circuit is completed from ground, armature 754 and working contact, armature 708 and working contact, armature 717, armature 722 and working contact, conductor 768, contact 19 (Figure 7-A) of the extra-control bank, extra-control wiper 764 (the wipers of the connector switch having reached contacts 19 and 29 of the banks in the manner explained in the preceding paragraph), armature 716, interrupter armature 759, magnet 760 to battery, thereby causing magnet 760 to self-drive the connector switch wipers from contacts 19 and 29 of the banks to contacts 10 and 20. As extra-control wiper 764 connects with contact 10 of its bank, there is no ground on this contact because armature 756 has restored and armature 754 has re-operated and, consequently, extra-control wiper 764 has completed its function of causing magnet 760 to self-drive the wipers of the connector switch to the last bank contacts of groups "1" and "2." Relay 715 has completely restored and, at armature 719, prepared a point in the circuit of relay 725. It will be observed that, at this point of operation, odd-even relay 700 is in the restored position with magnet 750 drawing no current. The connector switch is now in a position to respond to the dialling of the units digit "5" of the telephone number of station "B," and from this point on the operation is similar to that previously described for the case where the telephone number of station "B" was "15."

Should the first digit of the telephone number in the case just described have been "4" instead of "3," then the same action occurs with the following exceptions. The wipers of the connector switch are standing on contacts 10 and 20 of groups "1" and "2" as described in the preceding paragraph for the digit "3," but in this instance relay 715 remains operated in the period between the third and fourth impulses of the digit "4." At armature 706 and resting contact, relay 705 transmits the fourth impulse of the digit "4" to relay 715 in series with magnet 750, causing magnet 750 to re-energize for the third time and relay 715 to remain operated. Armatures 751—754 remain in the operated position during the third re-energization of magnet 750. Relay 705 re-operates upon the cessation of the fourth impulse of the digit "4" and, at armature 706, opens the series circuit through relay 715 and magnet 750. Magnet 750 correspondingly de-energizes for the fourth time thereby to cause armatures 751—754 to be restored. This restoration of armatures 751—754 selects wipers 771, 772 and 773 at the time relay 715 restores to normal and, at armature 719, prepares a point in the circuit of relay 725. It will be observed that, at this point of operation, odd-even relay 700 is in the restored position with magnet 750 drawing no current. The connector switch is now in a position to respond to the dialling of the units digit of the telephone number of station "B."

Should the first digit of the telephone number be "5" instead of "3" then the transmission of the third impulse of the dialled digit "5" causes the wipers of the connector switch to be automatically rotated over the bank contact sets of groups "1" and "2" to contacts 10 and 20 of groups "1" and "2" in the manner previously explained for the case where the first digit was "3." At the termination of the third impulse of the digit "5," armatures 751—754 are in the operated position and relay 715 also remains operated in the period between the third and fourth impulses of the digit "5." The wipers of the connector switch are now resting on the respective last contacts of groups "1" and "2." The fourth impulse of the digit "5" is transmitted from ground, armature 706 and resting contact, armature 712 and working contact, armatures 733, 737, 718, winding of relay 715 and magnet 750 in series to battery, causing magnet 750 to again re-energize and relay 715 to remain operated. Armatures 751—754 also remain operated during this re-energization of magnet 750. Relay 705 re-operates upon the cessation of the fourth impulse of the digit "5" and, at armature 706, opens the series circuit through relay 715 and magnet 750. Magnet 750 correspondingly de-energizes thereby to cause armatures 751—754 to be restored. Relay 715 remains operated in the period between the fourth and fifth impulses of the digit "5."

At armature 706 and resting contact, relay 705 transmits the fifth impulse of the digit "5" to relay 715 in series with magnet 750, causing magnet 750 to again re-energize and relay 715 to remain operated. As magnet 750 re-energizes and operates armature 756, a circuit is completed from ground, armature 754 and resting contact, armature 756, 721, conductor 769, contact 10 (Figure 7-A) of the extra-control bank, extra-control wiper 764, armature 716, interrupter armature 759, winding of magnet 760 to battery, thereby causing magnet 760 to self-drive the wipers of the connector switch from the last contacts of groups "1" and "2" to the first contacts of groups "3" and "4." As extra-control wiper 764 connects with the first contact (31) of its bank, the stepping circuit for magnet 760 is maintained by ground on contact 31 and, since contacts 31—38 are multipled together, magnet 760 continues to self-drive the wipers of the connector switch until the wipers reach contacts 39 and 49 of the banks.

Relay 705 re-operates upon the cessation of the digit "5" and, at armature 706, opens the series circuit through relay 715 and magnet 750. Magnet 750 correspondingly de-energizes thereby to cause a re-operation of armatures 751—754. Relay 715 however, is of the slow-to-release type and therefore, maintains its armatures in the respective operated positions for a short interval. As a consequence a circuit is completed from ground, armature 754 and working contact, armature 708 and working contact, armature 717, armature 722 and working contact, conductor 768, contact 39 (Figure 7-A) of the extra-control bank, extra-control wiper 764 (the wipers of the connector switch having reached contacts 39 and 49 of the banks in the manner explained in the preceding paragraph), armature 716, interrupter armature 759, winding of magnet 760 to battery, thereby causing magnet 760 to self-drive the wipers of the connector switch from contacts 39 and 49 of the banks to contacts 30 and 40. As extra-control wiper 764 connects with contact 30 of its bank, there is no ground on this contact because armature 758 has restored and armature 754 has re-operated and, consequently, extra-control wiper 764 has completed its function of causing magnet 760 to self-drive the wipers of the connector switch to the last bank contacts of groups "3" and "4." Relay 715 has completely restored and, at armature 719, prepared a point in the circuit of relay 725. It will be observed that, at this point of operation, odd-even relay 700 is in the restored position with magnet 750 drawing no current. The connector switch is now in a position to respond to the dialling of the units digit of the telephone number of station "B."

In a manner similar to that just described in the case where the first digit of the telephone number was "5," the wipers of the connector switch are positioned on the respective last contacts 50 and 60 of groups "5" and "6" when the first dialled digit is "7." Also in a similar manner, the wipers of the connector switch are positioned on the respective bank contacts 70 and 80 of groups "7" and "8" when the first dialled digit is "9." Since group 9 is the last of the odd numbered groups, it is unnecessary to multiple contacts 91—98 of the extra-control bank together.

Should the first digit of the telephone number be "6" instead of "4" then the transmission of the third impulse of the dialled digit "6" causes the wipers of the connector switch to be automatically rotated over the bank contact sets of groups "1" and "2" to contacts 10 and 20 of groups "1" and "2" in the manner previously explained in the case where the first digit was "3." At the termination of the third impulse of the digit "6," armatures 751—754 are in the operated position. Relay 715 also remains operated in the period between the third and fourth impulses of the digit "6." The wipers of the connector switch are now resting on the respective last contacts of groups "1" and "2." At armatures 706 and resting contact, relay 705 transmits the fourth impulse of the digit "6" to relay 715 in series with magnet 750, causing magnet 750 to again re-energize and relay 715 to remain operated. Armatures 751—754 remain in the operated position during this re-energization of magnet 750. Relay 705 re-operates upon the cessation of the fourth impulse of the digit "6" and, at armature 706, opens the series circuit through relay 715 and magnet 750. Magnet 750 correspondingly de-energizes thereby to cause armatures 751—754 to be restored. Relay 715 remains operated in the period between the fourth and fifth impulses of the digit "6."

At armature 706 and resting contact, relay 705 transmits the fifth impulse of the digit "6" to relay 715 in series with magnet 750, causing magnet 750 to again re-energize and relay 715 to remain operated. As magnet 750 re-energizes and operates armature 756, a circuit is completed from ground, armature 754 and resting contact, armatures 756, 721, conductor 769, contact 10 (Figure 7-A) of the extra-control bank, extra-control wiper 764, armature 716, interrupter armature 759, winding of magnet 760 to battery, thereby causing magnet 760 to self-drive the wipers of the connector switch from the last contacts of groups "1" and "2" to the first contacts of groups "3" and "4." As extra-control wiper 764 connects with the first contact (31) of its bank, the stepping circuit for magnet 760 is maintained by ground on contact 31 and, since contacts 31—38 are multipled together, magnet 760 continues to self-drive the wipers of the connector switch until the wipers reach contacts 39 and 49 of the banks.

Relay 705 re-operates upon the cessation of the fifth impulse of the digit "6" and, at armature 706, opens the series circuit through relay 715 and magnet 750. Magnet 750 correspondingly de-energizes thereby to cause a re-operation of armatures 751—754. Relay 715 remains operated during the period between the fifth and sixth impulses of the digit "6." At armature 706 and resting contact, relay 705 transmits the sixth impulse of the digit "6" to relay 715 in series with magnet 750, causing magnet 750 to again re-energize and relay 715 to remain operated. Armatures 751—754 remain in the operated position during this re-energization of magnet 750. Relay 705 re-operates upon the cessation of the sixth impulse of the digit "6" and, at armature 706, opens the series circuit through relay 715 and magnet 750. Magnet 750 correspondingly de-energizes thereby to cause armatures 751—754 to be restored. This restoration of armatures 751—754 selects wipers 771, 772 and 773 at the time relay 715 prepares a point in the circuit to relay 725 at armature 719. It will be observed that, at this point of operation, odd-even relay 700 is in the restored position with magnet 750 drawing no current. The connector switch is now in a position to respond to the dialling of the units digit of the telephone number of station "B."

In a manner similar to that just described for the case where the first digit of the telephone number was "6," the wipers of the connector switch are positioned on the respective bank contacts 50 and 60 of groups "5" and "6" when the first dialled digit is "8." Also in a similar manner, the wipers of the connector switch are positioned on the respective bank contacts 70 and 80 of groups "7" and "8" when the first dialled digit is "0." Since group "0" is the last of the even numbered groups it is unnecessary to multiple the contacts 91—98 of the extra-control bank together.

Assuming now that the calling station is station "B" instead of station "A," then cut-off relay 316 (Fig. 3-B) would be hunted and seized by wiper 533. Battery through the windings of cut-off relay 316 and line relay 306, armature 307 and working contact, conductor 333, bank contact, and wiper 533 would, therefore, shunt down relay 430, causing relay 430 to open the circuit of magnet 540 of the finder switch at armature 431, thereby stopping wipers 531, 532, and 533 on the bank contacts connected to line 305. The restoration of relay 430 completes a circuit for relay 440 from ground, armatures 424, 432, 454, winding of relay 440 to battery, causing relay 440 to operate and lock to ground by way of armatures 454, 444 and 424. At armature 441, relay 440 connects ground to conductor 473 of the finder switch by way of armature 426 and working contact, wiper 463 and bank contact, thereby to operate odd-tens relay 510 and cut-off relay 316, the circuit for cut-off relay 316 being completed through armatures 512 and 514. At armature 439, relay 440 shunts start relay 410, causing relay 410 to restore and open the circuit of relay 425 at armature 413. Relay 425 is of the slow-to-release type and, therefore, does not restore immediately but retains relay 440 operated for a short interval at armature 424. At armature 443, relay 440 opens another point in the circuit to relay 450, thereby to prevent the possible operation of relay 450 as long as relay 440 is operated. At armature 413 and resting contact, relay 410 completes a circuit to magnet 460 of the allotter before relay 425 has had sufficient time to restore. As relay 425 restores, this last circuit to magnet 460 is opened at armature 428, and magnet 460 steps wipers 461—465 of the allotter to the bank contacts of the next line-finder switch.

The operation of odd-tens relay 510 of the line-finder connects wipers 531, 532 and 533 to conductors 551, 552 and 553 leading to conductors 701, 702 and 703 of the connector switch (Figure 7) of the link by way of armatures 511, 512 and 513 thereby to seize the connector switch, and ground returned over conductors 703 and 553 from the connector switch is extended to wiper 533 and cut-off relay 306 before relay 425 in the allotter restores and opens the circuit of relay 440. The ground from the connector switch to wiper 533 is extended to the connector multiple bank contacts associated with conductor 333 thereby guarding telephone station "B" from intrusion.

Cut-off relay 316, upon operating, disconnects the upper winding of line relay 306 at armatures 301 and 303 to free the line from attachments, but line relay 306 remains operated through its lower winding and the winding of cut-off relay 316. At armature 302, cut-off relay 316 removes the ground from start relay 410 of the finder-switch allotter, thereby freeing the allotter from control by station "B." From this point on, the operation of the call is similar to that just described for the call initiated at station "A."

It should be understood at this time that the station line circuits shown in Figures 3-A and 3-B are typical for explanatory purposes only, and that this invention can be applied equally as well to any of the many well-known station line circuits.

*Calls in a 1000-station system*

Assuming now that station "A" (Figure 3-A) desires to call station "B" (Figure 3-B) in a 1,000-station system, then each link will comprise a line-finder switch, such as Figure 5, directly connected to a selector switch, such as Figure 6, and the selector switch (Figure 6) of the link will have access to connector switches, such as Fig. 7. The connector switches are divided into groups for accessing the lines of the telephone stations in the manner outlined in the previous short description of Figure 8.

Assuming further that a link comprising line-finder Figure 5 and selector switch Figure 6 is available at the moment and will be assigned to the call by allotter Figure 4 responsive to station "A" initiating a call, then in the manner described in the section titled "Calls in a 100-Station System," line-finder Figure 5 hunts for and seizes line 300 of calling station "A." As a consequence, even-tens relay 520 of the finder-switch and cut-off relay 320 of the line 300 are operated, also in the manner described in the section titled "Calls in a 100-Station System."

The operation of even-tens relay 520 of the line-finder connects wipers 541, 542 and 543 to conductors 551, 552 and 553 leading to conductors 601, 602 and 603 of the selector switch Figure 6 of the link by way of armatures 521, 522 and 523, thereby to seize the selector switch. Ground returned over conductors 603 and 553 from the selector switch is extended to wiper 543 and cut-off relay 320 before relay 425 in the allotter restores and opens the circuit of relay 450. The ground from the selector switch to wiper 543 is extended to the connector multiple bank contacts associated with conductor 343, thereby guarding telephone station "A" from intrusion.

Cut-off relay 320, upon operating, disconnects the upper winding of line relay 310 at armatures 321 and 322 to free the line from attachments, but line relay 310 remains operated through its lower winding and the winding of cut-off relay 320. At armature 323, cut-off relay 320 removes the last ground from start relay 410 of the finder-switch allotter (relay 450 having restored in the meantime), thereby freeing the allotter from control by station "A." The finder-switch allotter is now free to assign a finder switch to the next calling line.

Line 300 of station "A" is connected to line relay 605 of the link selector switch by way of conductors 551, 601, 552 and 602, thereby causing relay 605 to operate. At armature 606 and working contact, relay 605 completes the circuit to relay 610, causing relay 610 to operate. At armature 611, relay 610 returns ground to conductor 603 and conductor 553 of the link finder switch. Dial tone is supplied to station "A" by way of armature 636 and resting contact, condenser 634, armature 648 and resting contact, conductor 602, conductor 552, armature 522, wiper 542, bank contact, and positive talking conductor of line 300 leading back to station "A."

Upon hearing the well-known dial tone, the calling person at station "A" dials the number of station "B" which, in this instance, will be assumed to be "215." Responsive to the dialing of digit "2," the circuit to line relay 605 is interrupted two times, relay 605 restoring momentarily for each impulse and, at armature 606, opening the circuit to relay 610. Relay 610, however, is of the slow-to-release type and, therefore, does not restore during the impulsing period. Consequently, the circuits controlled by relay 605 are not disturbed.

At armature 606 and resting contact, relay 605 transmits the first impulse of the digit "2" to relay 615 in series with magnet 650 of odd-even relay 600, causing relay 615 to operate and magnet 650 to energize. This series circuit may be traced from ground by way of armature 633, armature 606 and resting contact, armature 612 and working contact, armature 624, winding of relay 615, winding of magnet 650 to battery. Armatures 655 and 656 of odd-even relay 600 are operated responsive to the energization of magnet 650 but perform no functions at this time. Armatures 651—654 of odd-even relay 600 do not operate upon the energization of magnet 650. Relay 615 is of the slow-to-release type and will, therefore, remain operated during the complete impulsing period of the digit "2."

Relay 605 re-operates upon the cessation of the first impulse of the digit "2" and, at armature 606, opens the series circuit through relay 615 and magnet 650. Magnet 650 correspondingly de-energizes thereby to cause the operation of armatures 651—654. Armature 654 completes a circuit for relay 620 from ground, armature 654 and working contact, armature 608 and working contact, armature 622 and resting contact, winding of relay 620 to battery, causing relay 620 to operate and lock to ground by way of armatures 623 and 609. Relay 615 remaining operated in the period between the first and second impulses of the digit "2" retains the testing circuit of odd-tens control wiper 663 open at armature 619, thereby making it impossible for wiper 663 to hunt for a free connector switch in group "1" at this time.

At armature 606 and resting contact, relay 605 transmits the second impulse of the digit "2" to relay 615 in series with magnet 650 from ground, armature 633, armature 606 and resting contact, armature 612 and working contact, armature 618, windings of relay 615 and magnet 650 in series to battery, causing magnet 650 to re-energize and relay 615 to remain operated. Armatures 651—654 remain operated during the re-energization of magnet 650.

Relay 605 re-operates upon the cessation of the second impulse of the digit "2" and, at armature 606, opens the series circuit through relay 615 and magnet 650, magnet 650 de-energizing for a second time thereby to cause armatures 651—654 to be restored. Relay 615 restores after a short interval. The restoration of relay 615 connects the windings of relay 645 and magnet 660 in series from ground to battery, with wiper 673 tapped in between the two windings. These circuits may be traced from wiper 673, armature 653 and resting contact, armature 646 and resting contact, winding of relay 645, armatures 613, 626, 637 and resting contact, and 609 to ground, and from wiper 673, armature 653 and resting contact, armature 646 and resting contact, armatures 619, 625, 638, interrupter armature 659, winding of magnet 660 to battery. Magnet 660 cannot operate through the high resistance of relay 645, but relay 645 can operate through the low resistance of magnet 660 except when relay 645 is shunted by ground on wiper 673 which will be the case if wiper 673 connects with a busy bank contact.

As previously explained, the groups "1" and "2" of the selector switch banks are in alignment with each other, i. e., the first contact set of group "1" is in alignment with the first contact set of group "2," etc. Odd-tens wipers 661, 662 and 663 normally stand on the respective first contacts of group "1," and wipers 671, 672 and 673 on the respective first contacts of group "2." It will, therefore, be readily seen that the two impulses of the dialled digit "2" are not required to operate magnet 660 for the purpose of advancing wipers 671, 672 and 673 to group "2," as these wipers are already standing on the first bank contact set of group "2." The two impulses of the digit "2" are required, in this instance, for causing the energization and de-energization of magnet 650 of odd-even relay 600 two times, thereby to cause armatures 651—653 to select even-tens wipers 671, 672 and 673 at the time relay 615 restores to normal and, at armature 619, establishes the testing circuit for even-tens control wiper 673. Consequently, wiper 673 will now automatically hunt for a free connector switch connected to a bank contact set of group "2." It will be observed that, at this point of operation, odd-even relay 600 is in the restored position with magnet 650 drawing no current.

Should the first bank contact set of group "2" be in prior use (busy) when the testing circuit to wiper 673 is completed, then there would be ground on wiper 673. As a consequence, when magnet 650 de-energizes at the conclusion of the second impulse of the digit "2," the ground would be extended to armature 646 and, hence, would shunt relay 645 thereby to cause magnet 660 to self-drive the wipers of the selector switch in well-known manner to search for a free connector switch in group "2." When wiper 673 contacts a free connector switch, the automatic hunting will cease and relay 645 will operate to extend line 300 through to the selected connector switch in a manner to be described in a later paragraph.

Should all of the connector switches of group "2" be in prior use when tested by wiper 673, then all-trunks-busy relay 635 is operated from ground on wiper 673, armature 653 and resting contact, armature 646 and resting contact, armatures 619, 625, extra-control wiper 664, contact 10 (Figure 6–A) of the extra-control bank, conductor 628, armature 614 and resting contact, armature 627, upper winding of relay 635 to battery, causing relay 635 to operate. At armature 638, relay 635 opens the circuit to magnet 660 to prevent magnet 660 from stepping the selector switch wipers to the first bank contact set (31) of group "3": at armature 637 and working contact, completes an obvious locking circuit for itself; and, at armature 636 and working contact, connects busy tone to condenser 634 thereby to inform the calling person at station "A" that all of the connector switches having access to station "B" are in prior use.

Assuming now that the connector switch connected to the first contact set of group "2" is free (idle), and that this connector switch is illustrated in Figure 7, then there will be no ground on the first bank contact set of group "2." Relay 645, therefore, operates in series with magnet 660. At armature 646, relay 645 disconnects magnet 660 from wiper 673 to prevent stepping of the wipers: at armature 632, locks itself from ground, armatures 611, 632, winding of relay 645, armatures 619, 625, 638, interrupter armature 659, winding of magnet 660 to battery: at armature 646 and working contact, connects ground to wiper 673 by way of armatures 611, 632, armature 646 and working contact, armature 653 and resting contact to guard connector Figure 7 from intrusion: at armatures 647 and 648, disconnects relay 605 from conductors 601 and 602; and, at armatures 647 and 648 and associated working contacts, extends line 300 to connector switch Figure 7 by way of wipers 671 and 672.

Relay 610 is restored to normal as a result of the operation of relay 645 and the release of relay 605, but relay 610 is slow to restore. A new locking circuit is, therefore, completed for relay 620 from ground returned over conductor 703 from connector switch Figure 7, bank contact, wiper 673, armature 653 and resting contact, armature 648 and working contact, armatures 613, 626, 637 and resting contact, 623, winding of relay 620 to battery, thereby preventing relay 620 from restoring when its original locking ground is disconnected at armature 609.

As a result of relay 620 remaining locked after relay 610 has restored, relay 645 is maintained in the locked position from the ground on wiper 673, armature 653 and resting contact, armature 646 and working contact, winding of relay 645, armatures 619, 625, 638, interrupter armature 659, winding of magnet 660 to battery. The ground on wiper 673 is also extended through armature 632 to conductor 603 for retaining line relay 310 and cut-off relay 320 of line 300 in the operated position. From this point on, connector switch Figure 7 is operated by impulses from station "A" to connect with, and signal, station "B" in the manner described in the section titled "Calls in a 100-Station System."

When the conversation between stations "A" and "B" has been terminated and both telephone handsets returned to the respective cradles, the connection is released. The line circuits 300 and 305, the finder switch Figure 5, and the connector switch Figure 7 are released in the manner described in the section titled "Calls in a 100-Station System." The selector switch Figure 6 is released and restored to normal in the following manner. The release of connector switch Figure 7 removes ground from wiper 673 thereby opening the locking circuits of relays 620 and 645, causing these two relays to restore. All of the relays of the selector switch are now at normal, and a homing circuit for the selector switch is completed from ground, armature 633, armature 606 and resting contact, armature 612 and resting contact, off-normal springs 665, armature 638, interrupter armature 659, winding of magnet 660 to battery. Magnet 660, consequently, self-drives wipers 661—673 in well-known manner until the wipers arrive at the respective first bank contact sets of groups "1" and "2," whereupon the circuit of magnet 660 is opened at off-normal springs 665.

Assuming now that the telephone number of station "B" is "115" instead of "215," then the dialling of the first digit "1" causes the following operation of selector switch Figure 6. The circuit to line relay 605 is interrupted once and relay 605, at armature 606, opens the circuit to relay 610, but relay 610 is of the slow-to-release type. At armature 606 and resting contact, relay 605 transmits the impulse to relay 615 in series with magnet 650, causing relay 615 to operate and magnet 650 to energize. Armatures 655 and 656 operate responsive to the energization of magnet 650 but perform no functions at this time. Armatures 651—654 do not operate upon the energization of magnet 650.

Relay 605 re-operates upon the cessation of the impulse of the digit "1" and, at armature 606, opens the series circuit through relay 615 and magnet 650. Magnet 650 correspondingly de-energizes thereby to cause the operation of armatures 651—654. Armature 654 completes a circuit for relay 620 from ground, armature 654 and working contact, armature 608 and working contact, armature 622 and resting contact, winding of relay 620 to battery, causing relay 620 to operate and lock to ground by way of armatures 623 and 609. Relay 615 restores after a short interval. The restoration of relay 615 connects the windings of relay 645 and magnet 660 in series from ground to battery, with wiper 663 tapped in between the two windings. Magnet 660 cannot operate through the high resistance of relay 645, but relay 645 can operate through the low resistance of magnet 660 except when relay 645 is shunted by ground on wiper 663 which will be the case if wiper 663 connects with a busy bank contact.

As previously explained, wipers 661, 662 and 663 normally stand on the respective first bank contacts of group "1." It will, therefore, be readily seen that the one impulse of the dialled digit "1" is not required to operate magnet 660 for the purpose of advancing wipers 661, 662 and 663 to group "1," as these wipers are already standing on the first bank contact set of group "1." The one impulse of the digit "1" is required, in this instance, for causing one energization and one de-energization of magnet 650 of odd-even relay 600, thereby to select odd-tens wipers 661, 662 and 663 at the time relay 615 restores and, at armature 619, establishes the testing circuit for odd-tens control wiper 663. Consequently, wiper 663 will now automatically hunt for and find a free connector switch connected to a bank contact set of group "1" in a manner similar to that previously described for wiper 673. From this point on, connector switch Figure 7 connects with, and signals, station "B" in a manner similar to that described in the section titled "Calls in a 100-Station System."

The release of selector switch Figure 6 upon the termination of the connection just described, is the same as that previously explained for the case where the telephone number of station "B" was "215," with the additional condition that odd-even relay 600 must be again energized and de-energized in order to return armatures 651—654 to their normal positions. This additional operation cycle of odd-even relay 600 is accomplished in the following manner: the restoration of relay 645 completes a circuit to magnet 650 of odd-even relay 600 from ground, armature 654 and working contact, armature 608 and resting contact, armature 649, interrupter armature 655, winding of magnet 650 to battery, causing magnet 650 to energize. At armature 655, magnet 650 opens its energizing circuit thereby to cause armatures 651—654 to restore to normal, whereupon the energizing circuit of magnet 650 is maintained open at the working contact of armature 654.

Assuming now that the telephone number of station "B" is "315" instead of "215" or "115," then the dialling of digit '3" causes the following operation of selector switch Figure 6. The circuit to line relay 605 is interrupted three times, relay 605 restoring momentarily for each impulse. At armature 606 and resting contact, relay 605 transmits the first impulse of the digit "3" to relay 615 in series with magnet 650, causing relay 615 to operate and magnet 650 to energize. Armatures 655 and 656 operate responsive to the energization of magnet 650 but perform no functions at this time. Armatures 651—654 do not operate upon the energization of magnet 650. Relay 615 due to its slow-to-release characteristic will remain operated during the complete impulsing period of the digit "3."

Relay 605 re-operates upon the cessation of the first impulse of the digit "3" and, at armature 606, opens the series circuit through relay 615 and magnet 650. Magnet 650 correspondingly de-energizes thereby to cause the operation of armatures 651—654. Armature 654 completes a circuit for relay 620 from ground, armature 654 and working contact, armature 608 and working contact, armature 622 and resting contact, winding of relay 620 to battery, causing relay 620 to operate and lock to ground by way of armatures 623 and 609. Relay 615 remains operated in the period between the first and second impulses of the digit "3," and retains the testing circuit of odd-tens control wiper 663 open at armature 619.

At armature 606 and resting contact, relay 605 transmits the second impulse of the digit "3" to relay 615 in series with magnet 650 from ground, armature 633, armature 606 and resting contact, armature 612 and working contact, armature 618, windings of relay 615 and magnet 650 in series to battery, causing magnet 650 to re-energize and relay 615 to remain operated. Armatures 651—654 remain operated during the re-energization of magnet 650. Relay 605 re-operates upon the cessation of the second impulse of the digit "3" and, at armature 606, opens the series circuit through relay 615 and magnet 650, magnet 650 de-energizing for a second time thereby to cause armatures 651—654 to be restored. Relay 615 remains operated in the period between the second and third impulses of the digit "3," and retains the testing circuit of even-tens control wiper 673 open at armature 619.

At armature 606 and resting contact, relay 605 transmits the third impulse of the digit "3" to relay 615 in series with magnet 650 from ground, armature 633, armature 606 and resting contact, armature 612 and working contact, armature 618, windings of relay 615 and magnet 650 in series to battery, causing magnet 650 to re-energize for a second time and relay 615 to remain operated. As magnet 650 re-energizes and operates armature 656, a circuit is completed from ground, armature 654 and resting contact, armatures 656, 617, 621, conductor 629, contact 11 (Figure 6–A) of the extra-control bank, extra-control wiper 664, armature 638, interrupter armature 659, winding of magnet 660 to battery, thereby causing magnet 660 to self-drive the wipers of the selector switch from the first bank contact sets of groups "1" and "2." As extra-control wiper 664 connects with its second bank contact (12), the stepping circuit for magnet 660 is maintained by ground through armature 616 and, since contacts 12–19 inclusive of the extra-control bank are multipled together, magnet 660 continues to self-drive the wipers of the selector switch until the wipers reach contacts 10 and 20 of the banks.

Relay 605 re-operates upon the cessation of the third impulse of the digit "3" and, at armature 606, opens the series circuit through relay 615 and magnet 650. Magnet 650 correspondingly de-energizes for a third time thereby to cause the re-operation of armatures 651—654. Relay 615, however, is of the slow-to-release type and, therefore, maintains its armatures in the respective operated positions for a short interval. As a consequence, a circuit is completed from ground, armature 654 and working contact, armatures 608, 622, 614 and associated working contacts, conductor 628, contact 10 (Figure 6–A) of the extra-control bank, extra-control wiper 664 (the wipers of the selector switch having reached contacts 10 and 20 of the banks in the manner explained in the preceding paragraph), armature 638, interrupter armature 659, winding of magnet 660 to battery, thereby causing magnet 660 to self-drive the selector switch wipers from contacts 10 and 20 of the banks to contacts 31 and 41 of groups "3" and "4." As extra-control wiper 664 connects with contact 31 of its associated bank, there is no ground on this contact because armature 656 has restored and armature 654 has re-operated and, consequently, extra-control wiper 664 has completed its function of causing magnet 660 to self-drive the wipers of the selector switch to the first bank contacts of groups "3" and "4." At this point, relay 615 has completely restored and, at armature 619, completed the testing circuit for wiper 663 so that wiper 663 will now automatically hunt for a free connector switch connected to a bank contact set of group "3." From this point on, the operation of the selector switch is similar to that described for the selector switch when the first digit of the telephone number of station "B" was "1."

Should the first digit of the telephone number in the case just described have been "4" instead of "3," then the same action occurs with the following exceptions. The wipers of the selector switch are standing on contacts 31 and 41 of groups "3" and "4" as described in the preceding paragraph for the digit "3," but in this instance relay 615 remains operated in the period between the third and fourth impulses of the digit "4," and retains the testing circuit of odd-tens control wiper 663 open at armature 619. At armature 606 and resting contact, relay 605 transmits the fourth impulse of the digit "4" to relay 615 in series with magnet 650, causing magnet 650 to re-energize for the third time and relay 615 to remain operated. Armatures 651—654 remain in the operated position during the third re-energization of magnet 650. Relay 605 re-operates upon the cessation of the fourth impulse of the digit "4" and, at armature 606, opens the series circuit through relays 615 and magnet 650. Magnet 650 correspondingly de-energizes for the fourth time thereby to cause armatures 651—654 to be restored. This restoration of armatures 651—654 selects wipers 671, 672 and 673 at the time relay 615 restores to normal and, at armature 619, establishes the testing circuit for even-tens control wiper 673. Consequently, wiper 673 will now automatically hunt for a free connector switch connected to a bank contact set of group "4."

Should the first digit of the telephone number be "5" instead of "3," then the transmission of the third impulse of the dialled digit "5" causes the wipers of the selector switch to be automatically rotated over the bank contact set of groups "1" and "2" in the manner previously explained in the case where the first digit was "3." At the termination of the third impulse of the digit "5," armatures 651—654 are in the operated position, and relay 615 also remains operated. The wipers of the selector switch are now resting on the respective first contacts of groups "3" and "4." Relay 615 remains operated in the period between the third and fourth impulses of the digit "5," and retains the testing circuit of odd-tens control wiper 663 open at armature 619. The fourth impulse of the digit "5" is transmitted from ground, armature 633, armature 606 and resting contact, armature 612 and working contact, armature 618, windings of relay 615 and magnet 650 in series to battery, causing magnet 650 to again re-energize and relay 615 to remain operated. Armatures 651—654 also remain operated during this re-energization of magnet 650. Relay 605 re-operates upon the cessation of the fourth impulse of the digit "5" and, at armature 606, opens the series circuit through relay 615 and magnet 650. Magnet 650 correspondingly de-energizes thereby to cause armatures 651—654 to be restored. Relay 615 remains operated in the period between the fourth and fifth impulses of the digit "5," and retains the testing circuit of even-tens control wiper 673 open at armature 619. At armature 606 and resting contact, relay 605 transmits the fifth impulse of the digit "5" to relay 615 in series with magnet 650, causing magnet 650 to again re-energize and relay 615 to remain operated. As magnet 650 re-energizes and operates armature 656, a circuit is completed from ground, armature 654 and resting contact, armatures 656, 617, 621, conductor 629, contact 31 (Figure 6-A) of the extra-control bank, extra-control wiper 664, armature 638, interrupter armature 659, winding of magnet 660 to battery, thereby causing magnet 660 to self-drive the wipers of the selector switch from the first bank contact sets of groups "3" and "4." As extra-control wiper 664 connects with the second contact of (32) of its bank, the stepping circuit for magnet 660 is maintained by ground through armature 616 and, since contacts 32-39 inclusive of the extra-control bank are multipled together, magnet 660 continues to self-drive the wipers of the selector switch until the wipers reach contacts 30 and 40 of the banks.

Relay 605 re-operates upon the cessation of the fifth impulse of the digit "5" and, at armature 606, opens the series circuit through relay 615 and magnet 650. Magnet 650 correspondingly de-energizes thereby to cause the re-operation of armatures 651—654. Relay 615, however, is of the slow-to-release type and, therefore, maintains its armatures in the respective operated positions for a short interval. As a consequence, a circuit is completed from ground, armature 654 and working contact, armatures 608, 622, 614 and associated working contacts, conductor 628, contact 30 (Figure 6-A) of the extra-control bank, extra-control wiper 664 (the wipers of the selector switch having reached contacts 30 and 40 of the banks in the manner explained in the preceding paragraph), armature 638, interrupter armature 659, winding of magnet 660 to battery, thereby causing magnet 660 to self-drive the wipers of the selector switch from contacts 30 and 40 of the banks to contacts 51 and 61 of groups "5" and "6." As extra-control wiper 664 connects with contact 51 of its bank, there is no ground on this contact because armature 656 has restored and armature 654 has re-operated and, consequently, extra-control wiper 664 has completed its function of causing magnet 660 to self-drive the wipers of the selector switch to the first bank contacts of groups "5" and "6." At this point, relay 615 has completely restored and, at armature 619, completed the testing circuit for wiper 663 so that wiper 663 will now automatically hunt for a free connector switch connected to a bank contact set of group "5." From this point on, the operation of the selector switch is similar to that described for the selector switch when the first digit of the telephone of station "B" was "1."

In a manner similar to that just described for the case where the first digit of the telephone number was "5," the selector switch is caused to hunt for a free connector switch connected to a bank contact set of group 7 when the first dialled digit is "7." Also in a similar manner, the selector switch is caused to hunt for a free connector switch connected to a bank contact set of group "9" when the first dialled digit is "9." Since group "9" is the last of the odd-numbered groups, it is unnecessary to multiple the contacts 91—99 of the extra-control bank together or to connect ground to contact 91.

Should the first digit of the telephone number be "6" instead of "4," then the transmission of the third impulse of the dialled digit "6" causes the wipers of the selector switch to be automatically rotated over the bank contact sets of groups "1" and "2" in the manner previously explained for the case where the first digit was "3." At the termination of the third impulse of the digit "6," armatures 651—654 are in the operated position, and relay 615 also remains operated. The wipers of the selector switch are now resting on the respective first contacts of groups "3" and "4." Relay 615 remains operated between the third and fourth impulse of the digit "6," and retains the testing circuit of odd-tens control wiper 663 open at armature 619. At armature 606 and resting contact, relay 605 transmits the fourth impulse of the digit "6" to relay 615 in series with magnet 650, causing magnet 650 to again re-energize and relay 615 to remain operated. Armatures 651—654 remain in the operated position during this re-energization of magnet 650. Relay 605 re-operates upon the cessation of the fourth impulse of the digit "6" and, at armature 606, opens the series circuit through relay 615 and magnet 650. Magnet 650 correspondingly de-energizes thereby to cause armatures 651—654 to be restored. Relay 615 remains operated in the period between the fourth and fifth impulses of the digit "6," and retains the testing circuit of even-tens control wiper 673 open at armature 619.

At armature 606 and resting contact, relay 605 transmits the fifth impulse of the digit "6" to relay 615 in series with magnet 650, causing magnet 650 to again re-energize and relay 615 to remain operated. As magnet 650 re-energizes and operates armature 656, a circuit is completed from ground, armature 654 and resting contact, armatures 656, 617, 621, conductor 629, contact 31 (Figure 6–A) of the extra-control bank, extra-control wiper 664, armature 638, interrupter armature 659, winding of magnet 660 to battery, thereby causing magnet 660 to self-drive the wipers of the selector switch from the first bank contact sets of groups "3" and "4." As extra-control wiper 664 connects with the second bank contact (32) of its bank, the stepping circuit for magnet 660 is maintained by ground through armature 616 and, since contacts 32—39 inclusive of the extra-control bank are multipled together, magnet 660 continues to self-drive the wipers of the selector switch until the wipers reach contacts 30 and 40 of the banks.

Relay 605 re-operates upon the cessation of the fifth impulse of the digit "6" and, at armature 606, opens the series circuit through relay 615 and magnet 650. Magnet 650 correspondingly de-energizes thereby to cause the re-operation of armatures 651—654. Relay 615 remains operated in the period between the fifth and sixth impulses of the digit "6," and retains the testing circuit of odd-tens control wiper 663 open at armature 619. At armature 606 and resting contact, relay 605 transmits the sixth impulse of the digit "6" to relay 615 in series with magnet 650, causing magnet 650 to again re-energize and relay 615 to remain operated. Armatures 651—654 remain in the operated position during this re-energization of magnet 650. Relay 605 re-operates upon the cessation of the sixth impulse of the digit "6" and, at armature 606, opens the series circuit through relay 615 and magnet 650. Magnet 650 correspondingly de-energizes thereby to cause armatures 651—654 to be restored. This restoration of armatures 651—654 selects wipers 671, 672 and 673 at the time relay 615 establishes the testing circuit for even-tens control wiper 673. Consequently, wiper 673 will now automatically hunt for a free connector switch connected to a bank contact set of group 6.

In a manner similar to that described for the case where the first digit of the telephone number was "6," the selector switch is caused to hunt for a free connector switch connected to a bank contact set of group "8" when the first dialled digit is "8." Also in a similar manner, the selector switch is caused to hunt for a free connector switch connected to a bank contact set of group "10" when the first dialled digit is "0." Since group "0" is the last of the even-numbered groups, it is unnecessary to multiple the contacts 91—99 of the extra-control bank together or to connect ground to contact 91.

*Stepping circuits of selector Figure 6*

In order that the various stepping circuits of selector Figure 6 may be more readily apparent, Figure 9 has been developed to show these stepping circuits in simple diagram form. Only a sufficient number of relays and contacts are included in Figure 9 to enable the tracing of the stepping circuits, certain of the intermediate relay contacts being indicated by the symbol "X."

Referring now to Figure 9, control wiper 663 and its related bank for group "1," and control wiper 673 and its related bank for group "2" are shown. The control banks for all other odd and even groups are omitted, as well as the negative and positive conductor wipers and related banks. Extra-control wiper 664 and its associated bank contacts for groups "1" and "3" are also shown, it being understood that there are no extra-control bank contacts for group "2."

The descriptions of the stepping circuits of selector Figure 6 detailed in the section titled "Calls in a 1000-Station System" may be readily applied to Figure 9 when the dialed selector digit is "1," "2," "3" or "4."

Having described the invention, what is considered new and is desired to have protected by Letters Patent is set forth in the following claims:

1. In a telephone system, a calling line, a group of trunks, sets of bank contacts connected to said trunks, means for extending said line to one of said trunks, means for busy-marking the set of bank contacts connected to said one trunk, means whereby said second-mentioned means is operated in response to said extension, a second calling line having a dial, a switch including a relay, conductors and wipers, said wipers standing on said one set of bank contacts connected to said one trunk, means for extending said second line to said switch, means for operating and restoring said relay, means whereby said fifth-mentioned means is controlled by an impulse from said dial received over said second calling line, means for connecting said wipers to said conductors of said switch thereby to connect said conductors to said one set of bank contacts, means whereby said seventh-mentioned means is operated responsive to said operation and restoration of the relay, means for causing said wipers to move from said one set of bank contacts to the set of bank contacts connected to another of said trunks, means whereby said ninth-mentioned means is operated responsive to the busy-marking of said one set of bank contacts, means for connecting said second line through said conductors and said wipers to said other trunk, means for disabling said connection of said second line with said other trunk, means for again operating and restoring said relay, means whereby said last-mentioned means is controlled by said disablement, means for disconnecting said wipers from said conductors thereby to free said conductors from said set of bank contacts connected to said other trunk, and means whereby said last-mentioned means is operated responsive to said last-mentioned operation and restoration of said relay.

2. The telephone system claimed in claim 1 together with means for returning said wipers from said set of bank contacts connected to said other trunk to said one set of bank contacts connected to said one trunk.

3. In a telephone system, an automatic switch having a self-interrupted wiper-driving magnet, an operating circuit for said magnet, a set of wipers, rows of bank contacts accessible to said wipers, said wipers standing on one of said rows of bank contacts, and a relay, means for operating and restoring said relay, means whereby said first-mentioned means is controlled by the first impulse of a received series of three impulses, means for partly preparing the operating circuit for said wiper-driving magnet, means whereby said third-mentioned means is operated responsive to the operation and restoration of said relay, means whereby said first-mentioned means is controlled by the second impulse of said series of impulses for operating and restoring said relay a second time, means for further preparing said operating circuit for said magnet, means whereby said sixth-mentioned means is operated responsive to the second operation and restoration of said relay, means whereby said first-mentioned means is controlled by the third impulse of said series of impulses for operating and restoring said relay a third time, means for completing said operating circuit for said magnet to cause said magnet to automatically self-drive said wipers across said one row of bank contacts to the next succeeding row of bank contacts, means whereby said eighth-mentioned means is operated responsive to the third operation of said relay.

4. The telephone system claimed in claim 3 together with conductors and means for connecting said wipers to said conductors, thereby to extend said conductors to said next succeeding row of bank contacts, and means whereby said last-mentioned means is operated responsive to the third operation and restoration of said relay.

5. For use in a telephone system, an automatic switch having incoming conductors over which impulses are received and two sets of wipers, a wiper switching relay, means for energizing and de-energizing said switching relay, means whereby said first-mentioned means is controlled by each impulse received over said incoming conductors, contacts on said relay, means whereby said contacts are operated in one manner in response to a first de-energization of said relay after its first energization, and operated in another manner responsive to a second de-energization of said switching relay after a second energization, said contacts switching through a connection to one set of wipers when operated in said one manner and switching through a connection to the other set of wipers when operated in said other manner.

6. In a telephone system, a calling line having a dial, a switch having a relay, circuit means, and two sets of wipers, one of said sets of wipers normally connected to said circuit means through said relay, said other set of wipers normally disconnected from said circuit means at said relay, means for extending said calling line to said switch, means for causing two different operations of said relay, said two different operations consisting of an operation of said relay followed by a restoration of said relay, means whereby said last-mentioned means is controlled by a digit dialed over said calling line, contacts on said relay, means whereby said contacts are operated responsive to said two different operations of said relay for disconnecting said one set of wipers from said circuit means and for connecting said other set of wipers to said circuit means, means for connecting said calling line through said circuit means to said other set of wipers, means for disconnecting said calling line from said other set of wipers, means for causing a recurrence of said two different operations of said relay, means whereby said last-mentioned means is controlled by said disconnection, and means whereby said contacts are restored responsive to said last two different operations of said relay for disconnecting said other set of wipers from said circuit means and for reconnecting said one set of wipers to said circuit means.

7. In a single-motion numerical switch having incoming conductors over which impulses are received and two sets of wipers, each set with a plurality of groups of bank contacts accessible thereto, said pluralities of groups arranged such that as one of said sets of wipers moves over contacts in the groups of one plurality of groups, the other set of wipers moves across corresponding contacts in corresponding groups in the other plurality of groups, said one set of wipers normally resting upon the first bank contact of the first of said groups accessible thereto, said other set of wipers normally resting upon the first bank contact of the first of said groups accessible thereto, means for stepping said wipers to the next succeeding pair of corresponding groups of bank contacts, means whereby said first mentioned means is controlled by the third impulse in a series of received impulses and by each odd-numbered impulse in said series thereafter received, and means for preventing the wipers from stepping to succeeding groups in response to even-numbered pulses.

8. In a numerical switch having first and second sets of wipers, odd-numbered groups of outlets and even-numbered groups of outlets accessible respectively to said first and second sets of wipers, incoming conductors connected to said switch and over which impulses are received, a wiper switching relay; means for energizing and de-energizing said switching relay; means whereby said first-mentioned means is controlled by each one of a series of impulses received over said conductors, contacts on said relay; means whereby said contacts are operated in response to each odd-numbered energization and de-energization and are restored in response to each even-numbered energization and de-energization, said contacts switching through a connection to said first set of wipers when operated, and switching through a connection to said second set of wipers when restored; means for stepping simultaneously each of said sets of wipers to the next succeeding pair of groups of outlets accessible to said set of wipers; means whereby said last-mentioned means is controlled by the third impulse in said series of impulses and thereafter by each succeeding odd-numbered impulse in the series; one of said groups of outlets pre-determined by the number of impulses in the series of impulses received; said switching relay, contacts, wipers and all of said means co-operating in response to said series of received impulses to step to said pre-determined group of outlets the set of wipers having access thereto, and to switch through a connection to said last-mentioned set of wipers.

9. In a telephone system, a calling line having an impulsing device, a switch including a relay, a circuit arrangement and wipers, means for extending said calling line to said switch, means for operating and restoring said relay, means whereby said second-mentioned means is controlled by an impulse from said pulsing device received over said calling line, means for connecting said wipers to said circuit arrangement, means whereby said fourth-mentioned means is operated responsive to said operation and restoration of said relay, means for connecting said calling line through said circuit arrangement to said wipers, means for disconnecting said calling line from said wipers, means for again operating and restoring said relay, means whereby said eighth-mentioned means is controlled by said disconnection of said calling line, means for disconnecting said wipers from said circuit arrangement, means whereby said last-mentioned means is operated responsive to the second operation and restoration of said relay.

10. In a telephone system, a calling line having a dial, a switch incorporating a relay, a circuit arrangement and wipers normally disconnected from said circuit arrangement, means for extending said calling line to said switch, means for causing two different operations of said relay, means whereby said second-mentioned means is controlled by a digit dialed over said calling line, means for connecting said wipers with said circuit arrangement, means whereby said fourth-mentioned means is operated in response to said two different operations of said relay, means for connecting said calling line through said circuit arrangement to said wipers, means for disconnecting said calling line from said wipers, means for again causing said two different operations of said relay, means whereby said last-mentioned means is controlled by said disconnection of said calling line, means for disconnecting said wipers from said circuit arrangement, and means whereby said last-mentioned means is operated in response to said last two different operations of said relay.

11. In an automatic switch, a relay having an "A" and a "B" contact, means for operating said relay, means whereby said relay operating means is operated responsive to the initiation of each impulse of a received series of two impulses, means whereby said "A" contact is operated in response to each operation of said relay, means for restoring said relay, means whereby said relay restoring means is operated responsive to the termination of each impulse in said series of impulses, means whereby said "A" contact is restored in response to each restoration of said relay, means for operating and restoring said "B" contact, means for conditioning said "B" contact operating and restoring means preparatory to operating said "B" contact, means whereby said conditioning means is controlled by the first operation of said relay, means whereby said conditioned "B" contact operating and restoring means is operated in response to the first restoration of said relay, thereby to operate said "B" contact, means for causing a different conditioning of said "B" contact operating and restoring means preparatory to restoring said "B" contact, means whereby said different conditioning means is controlled by the second operation of said relay, means whereby said differently conditioned "B" contact operating and restoring means is operated in response to the second restoration of the relay, thereby to restore said "B" contacts.

12. In an automatic switch having a first and second set of wipers, a first and second group of outlets accessible to said first and second set of wipers respectively, an electromagnet, conductors, contacts on said electromagnet, said contacts normally connecting said first set of wipers to said conductors, means for energizing and de-energizing said electromagnet, means whereby said first mentioned means is controlled by each impulse of a received series of impulses, means whereby said contacts are operated responsive to a first energization and de-energization of said electromagnet, circuit means whereby said first set of wipers is disconnected from said conductors and said second set of wipers is connected to said conductors in response to each operation of said contacts, means whereby said contacts are restored responsive to a second energization and de-energization of said electromagnet, circuit means whereby said second set of wipers is disconnected from said conductors and said first set of wipers is connected to said conductors in response to each restoration of said contacts, means whereby said contacts are thereafter operated responsive to each succeeding odd-numbered energization and de-energization of said electromagnet, said first circuit means disconnecting said first set of wipers from said conductors and reconnecting said second set of wipers to said conductors upon each operation of the contacts, and means whereby said contacts are thereafter restored responsive to each succeeding even-numbered energization and de-energization of said electromagnet, said second circuit means again disconnecting said second set of wipers from said conductors and again reconnecting said first set of wipers to said conductors upon each restoration of the contacts.

RUDOLPH FRANK STEHLIK.

References Cited in the file of this patent

UNITED STATES PATENTS

| Number | Name | Date |
|---|---|---|
| 1,569,936 | Land | Jan. 19, 1926 |
| 1,849,694 | Saunders | Mar. 15, 1932 |
| 1,914,384 | Richardson | June 20, 1933 |
| 1,922,237 | Escott | Aug. 15, 1933 |
| 1,924,661 | Stehlik | Aug. 29, 1933 |
| 1,956,371 | Christian | Apr. 24, 1934 |
| 2,090,522 | Sippel | Aug. 17, 1937 |
| 2,289,896 | Bakker | July 14, 1942 |
| 2,294,907 | Hovland | Sept. 8, 1942 |
| 2,416,086 | Christian | Feb. 18, 1947 |
| 2,416,109 | Long | Feb. 18, 1947 |
| 2,458,262 | Grimes | Jan. 4, 1949 |